A. W. ROBERTS.
LEATHER STRETCHER.
No. 22,893. Patented Feb. 8, 1859.
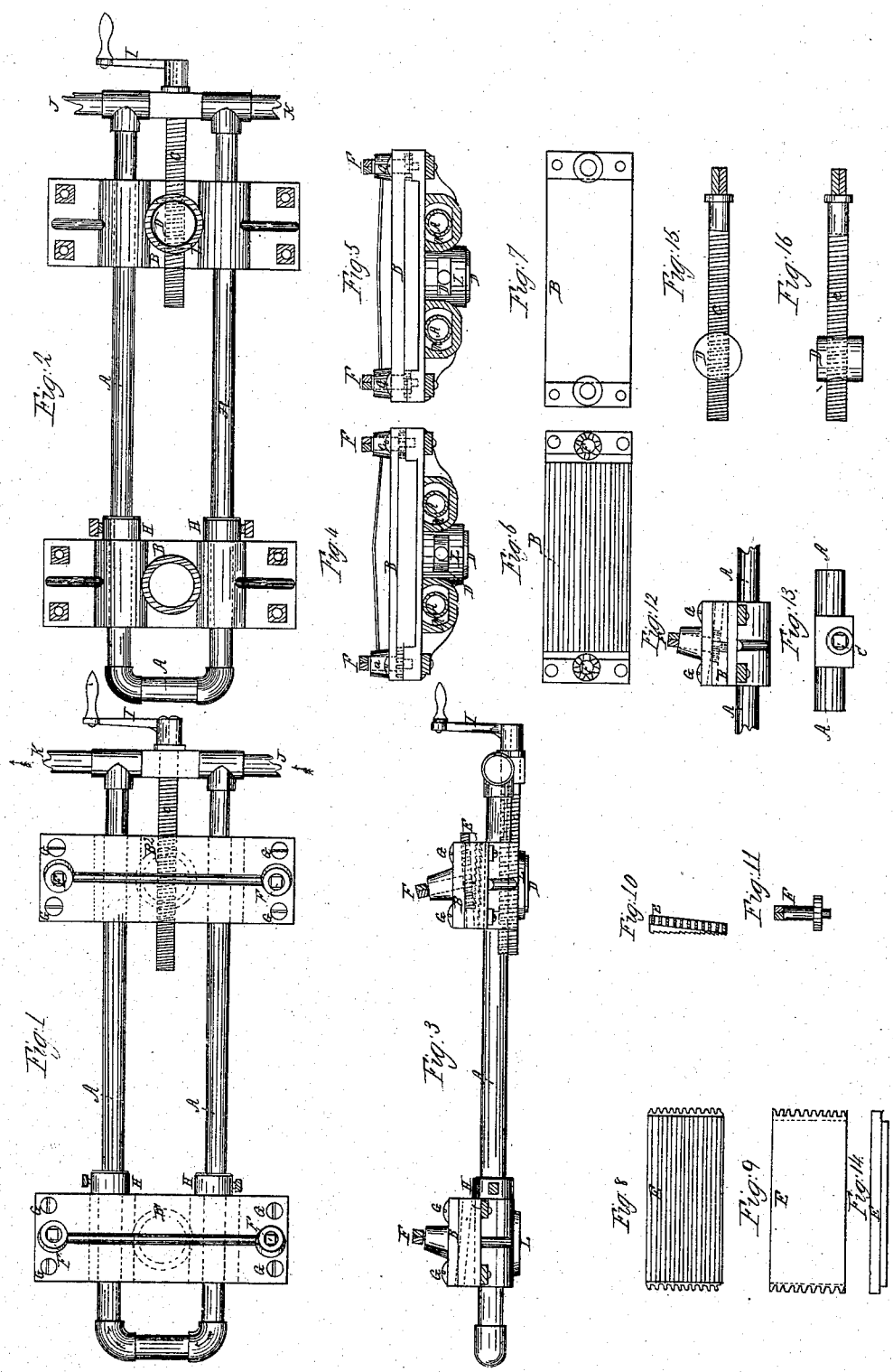

UNITED STATES PATENT OFFICE.

ALBERT W. ROBERTS, OF HARTFORD, CONNECTICUT.

MACHINE FOR STRETCHING LEATHER.

Specification of Letters Patent No. 22,893, dated February 8, 1859.

*To all whom it may concern:*

Be it known that I, ALBERT W. ROBERTS, of Hartford, county of Hartford, State of Connecticut, have invented a new and useful Improvement in Machines for Stretching Leather; and I do hereby declare the following is a full and exact description thereof, reference being had to the accompanying drawings and letters of reference marked thereon.

The nature of my invention consists in the mode of constructing machines for stretching leather by using a hollow tube for the frame or ways, for the purpose of introducing steam for drying purposes also the manner of constructing the jaws to hold the leather.

To enable others skilled in the art to make and use my invention I will proceed to describe its construction and operation.

Figure 1, plan of stretcher showing frame, jaws, screws, &c.; Fig. 2, bottom of stretcher showing ditto; Fig. 3, side of stretcher showing ditto; Fig. 4, front end view showing jaw end of frame, &c.; Fig. 5, back end view showing ditto; Fig. 6, plan of top of bottom part of jaws with teeth; No. 7, plan of bottom of top part of jaws; Fig. 8, bottom of wedge; Fig. 9, top of wedge; Fig. 10, end of wedge; Fig. 11, gear and shaft; Fig. 12, end of jaw with part of frame; Fig. 13, end of frame showing end of screw; Fig. 14, edge of wedge; Fig. 15, screw and top of nut; Fig. 16, screw and side of nut.

Letter A, frame made of hollow tube; letter B, jaws for holding leather; letter C, screw; letter D, nut for screws; letter E, wedge; letter F, gear and shaft; letter G, bolts and nuts; letter H, collar and set screw; letter I, cranks; letter J, inlet steam pipe; letter K, outlet steam pipe; letter L, box for nut; letter M, holes through jaws for tubes.

The frame A A I construct of a hollow tube for the purpose of admitting steam for drying purposes. The sliding heads or jaws B B are made to slide on the tubes A A through holes M M Fig. 4 and Fig. 5. The jaw $B^1$, Fig. 1st is made adjustable on the tubes by moving the collars H H to any desired length from the jaw $B^2$, Fig. 1. The jaw $B^2$ Fig. 1 is attached to screw $c$ by nut D. Said nut D is made round (see Figs. 15 and 16) to fit the box L into which it rests. The box L has a slot cut in each side that the screw $c$ may go through and allow the jaw B to vibrate on the nut D. The inside of the jaws B B on the top of the lower part are supplied with teeth to correspond with those in the underside of the wedge E. Said wedge E has on its ends a way or slide made parallel with its top side. The end of the wedge E has teeth cut in it for the admission of the gears F F that the wedge E may be thrown back when required. The ways or track on which the wedge E rests in the jaw B, are made in the lower part of the jaw B and are made parallel with the top of the wedge E when it rests on its ways or track. The shafts and gears F, F, are put in each end of the jaws and work independent of each other that the ends of the wedge E may be thrown down more or less according to the thickness of either end of the leather to be stretched, the gears F F are let into the jaws B B at right angles with the track on which the wedge E rests that the teeth may work into the teeth of the wedge E. The holes M, M, that are made in the jaws, B, B, where the tubes A A run through are made wider than the diameter of the tube A A that the head B, B, may have a chance to draw more one side than the other according to the difference in the firmness of the leather, at the same time turning on the nut D in the slotted box M through which the screw $c$ passes. The pipe I is for the admission of steam for the purpose of drying of the leather when stretched; the pipe K for the outlet or conductor to another frame or frames.

The operation of the stretcher is this: The wedge E is thrown back as seen at letter E Fig. 3, and leather is placed through B and under the wedge E. The wedge E is then pushed in and slides down on the ways till it is stopped by the leather. The face of the wedge E and the top of the bottom of jaw B are both on the leather and are parallel with each other, the strain is put on by the screws $c$, the wedge E is drawn in and firmly secures the leather to the jaws. When the leather is required to be taken out the screw $c$ is loosened and a wrench is applied to the shafts of the gears F F and turned to throw out the wedge E by the teeth of the gears fitting the teeth on the wedge. The ends of the wedge being independent of each other, on being drawn in fits itself to difference in the thickness of the leather at each end and secures the thinnest as well as the thickest part.

The advantages of this over other leather stretchers is that by using hollow tubes for frames steam can be applied for drying purposes which will require but ¼ of the time to dry the leather and save three-quarters of the expense of the number of stretchers and consequently ¾ of the expense; also the advantage of fastening both sides of a thick and thin piece of leather as well as though it were even thickness.

What I claim as my invention is—

1. The constructing of the jaws of leather stretchers with ways for the wedges to slide on, that the wedges may be so relieved from the leather when drawn back that the leather can be put in without removing the wedge from the jaws.

2. I also claim making the frames of hollow tubes on which the jaws slide and also the application of steam to said frame for drying purposes; also the shafts and gears for throwing back the wedge all of which is herein set forth and described.

ALBERT W. ROBERTS.

Witnesses:
 FRANCIS G. GILLSON,
 E. B. STRONG.